United States Patent
Choi

(10) Patent No.: US 7,412,621 B2
(45) Date of Patent: Aug. 12, 2008

(54) PROCESSOR DUPLEXING APPARATUS BASED ON RTOS IN MOBILE COMMUNICATION SYSTEM AND METHOD THEREOF

(75) Inventor: Woo-Young Choi, Kyounggi-Do (KR)

(73) Assignee: LG-Nortel Co., Ltd, Seoul (KR)

( * ) Notice: Subject to any disclaimer, the term of this patent is extended or adjusted under 35 U.S.C. 154(b) by 1081 days.

(21) Appl. No.: 10/309,163

(22) Filed: Dec. 4, 2002

(65) Prior Publication Data

US 2003/0119475 A1   Jun. 26, 2003

(30) Foreign Application Priority Data

Dec. 24, 2001   (KR) ............................... 2001-84286

(51) Int. Cl.
*G06F 11/00* (2006.01)

(52) U.S. Cl. ........................... 714/10; 714/11

(58) Field of Classification Search ............ 714/10, 714/11
See application file for complete search history.

(56) References Cited

U.S. PATENT DOCUMENTS

| | | | |
|---|---|---|---|
| 5,974,491 A * | 10/1999 | Jung et al. ................. | 710/106 |
| 6,246,666 B1 * | 6/2001 | Purcell et al. ............... | 370/221 |
| 6,629,266 B1 * | 9/2003 | Harper et al. ................ | 714/38 |
| 6,631,394 B1 * | 10/2003 | Ronkka et al. .............. | 718/100 |
| 6,978,398 B2 * | 12/2005 | Harper et al. ................ | 714/13 |
| 7,032,029 B1 * | 4/2006 | Tanzman et al. ............ | 709/245 |
| 7,039,783 B2 * | 5/2006 | Koo ........................... | 711/168 |
| 7,039,827 B2 * | 5/2006 | Meyer et al. ................ | 714/4 |
| 7,069,317 B1 * | 6/2006 | Colrain et al. ............. | 709/224 |

FOREIGN PATENT DOCUMENTS

JP   10-198574   7/1998

* cited by examiner

*Primary Examiner*—Emerson C Puente
(74) *Attorney, Agent, or Firm*—Ked & Associates, LLP

(57) ABSTRACT

A processor duplexing method is applied to a 3G mobile communication system switching operation without involving application software. In this method, Real-Time operating system (RTOS) detects that a duplexing operation is being performed. While the duplexing switching operation is being performed, the RTOS and a PCI controlling unit dump a memory of an active board to a standby board, thereby synchronizing a memory between the active board and the standby board. Once the duplexing switching operation is complete, the standby board sequentially starts operation of the active board. In this method, duplexing of a processor level is performed without using application software in the RTOS. Instead, duplexing is a performed by a substructure (hardware and OS). As a result the burden of having the application software grow larger and more complicated is significantly reduced.

12 Claims, 3 Drawing Sheets

PROCESSOR DUPLEXING APPARATUS BASED ON RTOS IN MOBILE COMMUNICATION SYSTEM AND METHOD THEREOF

BACKGROUND OF THE INVENTION

1. Field of the Invention

The present invention relates to a mobile communication system, and more particularly to an apparatus and method for duplexing a high-speed processor board using a real-time operating system (RTOS) in a mobile communication system.

2. Background of the Related Art

Unlike a general computer system, a control system of a full electronic exchange requires a high-sensitivity fault tolerancy function and a real-time process. To meet demand, each exchange adopts various structures according to conditions. Most exchanges basically adopt a duplex method to perform fault tolerancy, and some of them adopt a load-sharing method in a multi-processor structure.

Generally speaking, there are two types of duplex methods: a synchronized duplex method (hot standby) and a synchronized duplex method (warm-or cold standby).

In the synchronized duplex method, an active device and a standby device are synchronized by a micro-level instance, instruction word-instance, or a program-process instance to operate simultaneously. Therefore, the synchronized duplex method is intended to recover from a fault condition as quickly as possible when it occurs.

In a system using a common processor such as a mobile communication exchange, the synchronized method of the instruction-word instance is considered undesirable because it exhibits such severe performance degradation that it can hardly be implemented. Also, the synchronized method of the program-process instance experiences performance degradation due to a software load, even though it has a little performance degradation. Especially, in a system using a parallel-process operating system, software overhead and overlapping become severe.

In an asynchronized duplex method, a standby processor is not initially operated, and subsequently starts an operation that has been performed by an active processor at a time when the active processor is in fault. There are at least two concerns in implementing the asynchronized duplex method: To maintain the same memory data in both the active device and the standby device (data consistency) and to quickly switch the standby device to perform a normal operation (continuous operation).

To solve such problems, in most switching systems, a data change in the operating active device is reflected using a counter device, standby device. This involves a first method, which transmits changed data of the active device to the standby device in message form, and a second method, which concurrently writes changed data into both the active device and the standby device. In the first method, performance degradation of hardware can be decreased but overhead of software is significant. Moreover, this overhead sharply increases as the amount of information transmission increases. In the second method, overhead of software is reduced but performance degradation takes place.

Generally, most second generation (2G) mobile communication systems including Digital Cellular Network (DCN), Personal Communication Service (PCS), and Wireless Local Loop (WLL), have adopted the second method for concurrently writing changed data into the active and standby devices.

More specifically in a 2G mobile communication system, a D channel is connected by hardware between two duplex processor boards, namely the active board and the standby board. Also, accessed contents of a local memory by a processor of the operating active board are also reflected in a memory of the standby board on a real-time basis through the D channel without software. Since memory contents of the standby board are equally changed when memory contents of the active board are changed, memory synchronization between the active board and standby board can be maintained when the active board is normally operated.

When a fault of the active board is detected, the active board takes over a controlling authority to the standby board. In this process, information of a Program Counter (PC) and contents of various registers are transmitted to the standby board. The standby board receives the controlling authority from the active board and subsequently starts the operation that has been performed by the active board, or that was being performed at the time the fault was detected.

In the duplex processor of the 2G mobile communication system operating according to the concurrent writing duplex method, since the memory contents of the standby board is already identical to that of the active board, when a fault occurs at the active board, the standby board has only to take over the controlling authority from the active board to complete duplex switching operation.

However, unlike the 2G mobile communication system, 2.5G and 3G mobile communication systems use a processor having faster performance speed than that used in the 2G mobile communication system. Therefore, a high-speed processor having upgraded kinds of Central Processing Unit (CPC) and clock speed is used. Accordingly, this system can be sensitive to noise at the time of transmitting data and a fault can occur at the time of reading/writing a memory. Consequently, the concurrent writing method is not appropriate for use in 2.5G or 3G mobile communication systems.

The above references are incorporated by reference herein where appropriate for appropriate teachings of additional or alternative details, features and/or technical background.

SUMMARY OF THE INVENTION

An object of the present invention is to provide a processor duplexing apparatus based on RTOS in a mobile communication system and a method thereof, wherein the apparatus supports duplex operation using a high-speed processor to prevent a fault in the mobile communication system.

Another object of the present invention is to provide a processor duplexing apparatus based on RTOS in a mobile communication system and a method thereof, wherein duplexing of the processor level is realized using a common VxWorks Real Time Operating System RTOS).

Another object of the present invention is to provide a processor duplexing apparatus based on RTOS in a mobile communication system and a method thereof, wherein duplexing of the processor level is realized without the use of application software in the RTOS and wherein duplexing is performed by a substructure (hardware and OS), thereby preventing the application software from growing larger and more complicated.

To achieve these and other objects and advantages of the present invention, the present invention provides a processor duplexing apparatus which is based on RTOS in a mobile communication system and which includes an active board and a standby board have RTOS which detects requirement of a dual switching and executes the dual switching.

The present invention is also a processor duplexing apparatus based on RTOS in a mobile communication system which includes a fault detection block for detecting a fault occurrence; a fault management block for classifying and managing the fault; a duplexing state management block for managing a whole duplexing state and a state transition; a fault recovery block for requiring a switching for duplexing and recovering a fault when the classified fault requires a switching for duplexing; and an interface block having an interfacing performance with a user.

The present invention is also a method which duplexes a processor based on RTOS in a mobile communication system by detecting whether a switching for duplexing is requited or not, dumping a memory of the active board to a memory of the standby board, and starting an operation of the standby board in order to succeed to an operation of the active board and resetting the active board.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein.

DETAILED DESCRIPTION OF PREFERRED EMBODIMENTS

In the present invention, a processor duplexing apparatus in 2.5G and 3G mobile communication system is based on a real-time operating system (RTOS), and a processor duplexing apparatus, which can be operated dually without an application software is realized by using the RTOS.

Figure 1:
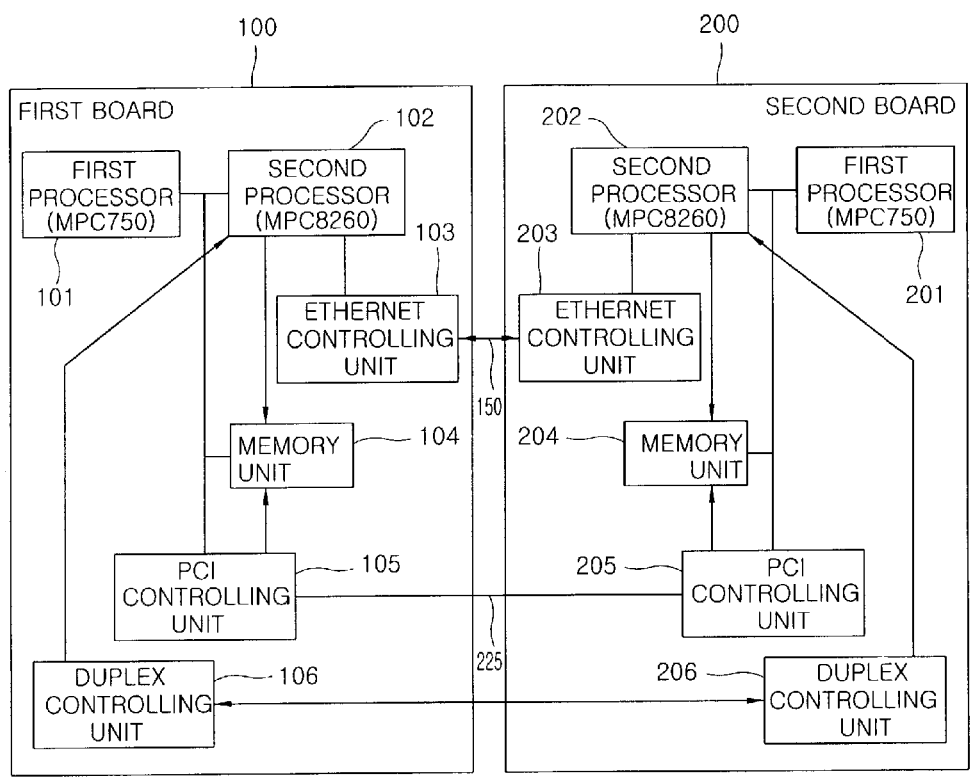
FIG. 1 illustrates a structure of a processor duplexing apparatus based on RTOS in a mobile communication system according to embodiments of the present invention.

FIG. 1 illustrates a structure of a processor duplexing apparatus based on RTOS in a mobile communication system according to one embodiment of the present invention. This apparatus includes a first board 100, a second board 200, and a PCI bus 225 connected between the first and second boards 100 and 200 corresponding to a main path for duplexing.

The first board includes a first processor 101 and a second processor 102 dually operated to reduce a load of the system, a memory unit 104 for storing programs and data required at the system operation, a PCI controlling unit 105 for dumping contents of the memory unit 104 to a memory unit 204 of the counter board by directly accessing the memory unit 104 at the time of switching for duplexing, an ethernet controlling unit 103 for transmitting data between the first board and the second board through a high-speed ethernet channel 150, and a duplexing control unit 106 for preventing a memory access collision between the first board and the second board. The first and second processors 101 and 102 are operated by the RTOS, which performs a duplexing without application software.

The ethernet controlling unit 103 may replace performance of the PCI bus as the high-speed ethernet channel when a fault occurs at the PCI bus at the time of memory dumping or when the PCI controlling unit 105 is not a normal state. An explanation of the second board 200 will be omitted since it has the same structure as the first board 100.

Figure 2:
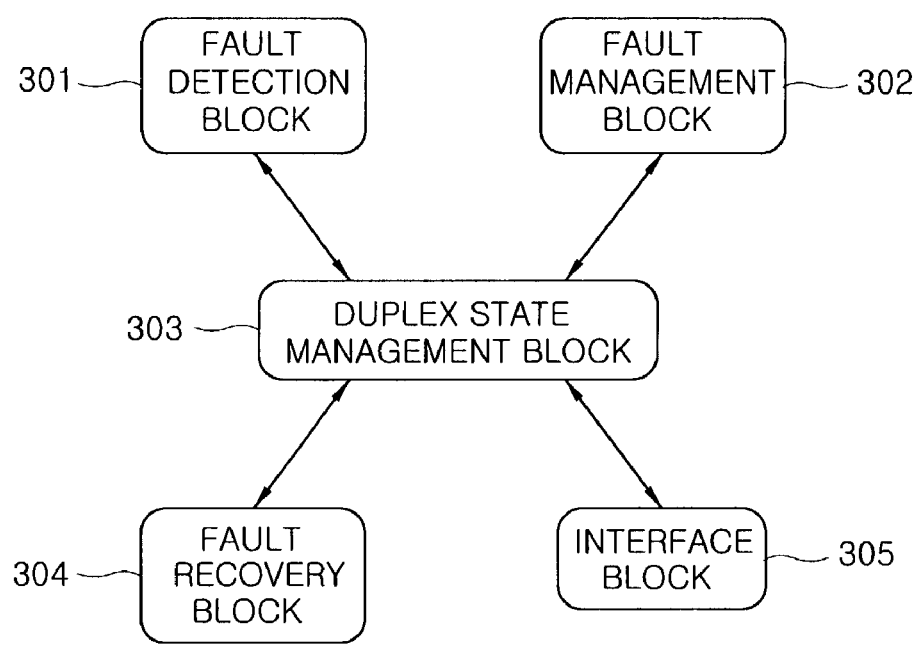
FIG. 2 illustrates a structure of a Real Time Operating System (RTOS) or duplexing a processor in a mobile communication system.

FIG. 2 is a diagram showing a structure of a Real-Time Operating System (RTOS) for duplexing a processor in a mobile communication system. The RTOS includes a fault-detection software block 301 (hereinafter abbreviated "block") for detecting whether or not a fault occurs, a fault-management block 302 for classifying and managing the fault, a duplexing state and state transition, a fault recovery block 304 for recovering a fault by taking proper steps, and an interface block 305 for performing interfacing for a user's Man Machine Communication (MMC), a shell, and etc. The fault recovery block 304 performs a duplex-switching an operation. The fault detection block 301, fault management block 302, fault recovery block 304, and interface block 305 are operative by connecting one another in the presence of the duplexing state management block 303. The RTOS preferably includes VxWorks made from a company of Wind River Systems.

Severe faults which occur at the time of operating a duplex processor in a mobile communication system are almost shown as interrupts relevant to hardware. The interrupts include an interrupt which occurs as a result of a hardware fault at the time of operating the system an interrupt which occurs at a time when a self test of each board fails, etc. Hereinafter, fault levels will be explained. Fault levels may be classified into one of three types: critical, major, and minor faults. A critical fault corresponds to a state in which it is difficult to maintain normal service. Critical faults include, for example, a fault of exterior input and output (I/O) communication, a fault of a mounted device, or a case where an exception is generated due to a software error. When this type of fault occurs, switching for duplexing is performed with a duplexing processor to recover the error.

A major fault includes a case in which a number of errors are increased in a unit time by statistics data not a constant short of an exterior I/O, a case in which a board is removed by a users request, a case in which an exterior connection cable is opened, and a case in which a software memory is deficient. In that case, a restart process is performed to recover the error.

A minor fault includes and I/O error which does influence a service, an error in a return value for a software function call, and an error generated at the time of allocating a memory. In that case, the error contents are stored and the errors are notified to the user.

The fault detection block 301 of the RTOS detects a fault by the occurrence of an interrupt, and the fault management block 302 classifies the detected fault as a critical, major, or minor fault. The fault recovery block 304 calls a proper recovery routine for major and minor faults and requires switching for duplexing for a critical fault or performs an appropriate step such as hardware replacement.

In the above steps, the RTOS accesses duplexing state management information from the duplexing state management block 303 and the recovery result is immediately reflected in the duplexing state management information. Also, the user is given notification of the fault information in the form of a fault message, and then the fault information is continuously collected and managed on purpose of the fault renewal and a statistics information collection.

The duplexing state management block 303 determines the active operation or the standby operation and performs duplexing until the RTOS is completely operated. Then, block 303 controls a transition into a duplexing state relevant to switching and performs a control operation with regard to a transition into a duplexing state such as the standby state by loading for a change of a software program. Also, the duplexing state management block 303 maintains and renews an overall duplexing state information required at said controls.

In a mobile communication system dually operated, while the first board 100 is operating in active state, if hardware of the active processor (the first processor 101 or the second processor 102) experiences a critical fault such as power off, the fault recovery block 304 of the RTOS immediately performs a switching operation for duplexing in order to not adversely affect a user's program currently being performed.

Also, in case of checking a hardware state of the active processor, the duplexing state management block of the active processor 303 takes over a controlling authority to the standby processor and transits the active processor as a standby state or a debugger state.

Figure 3:
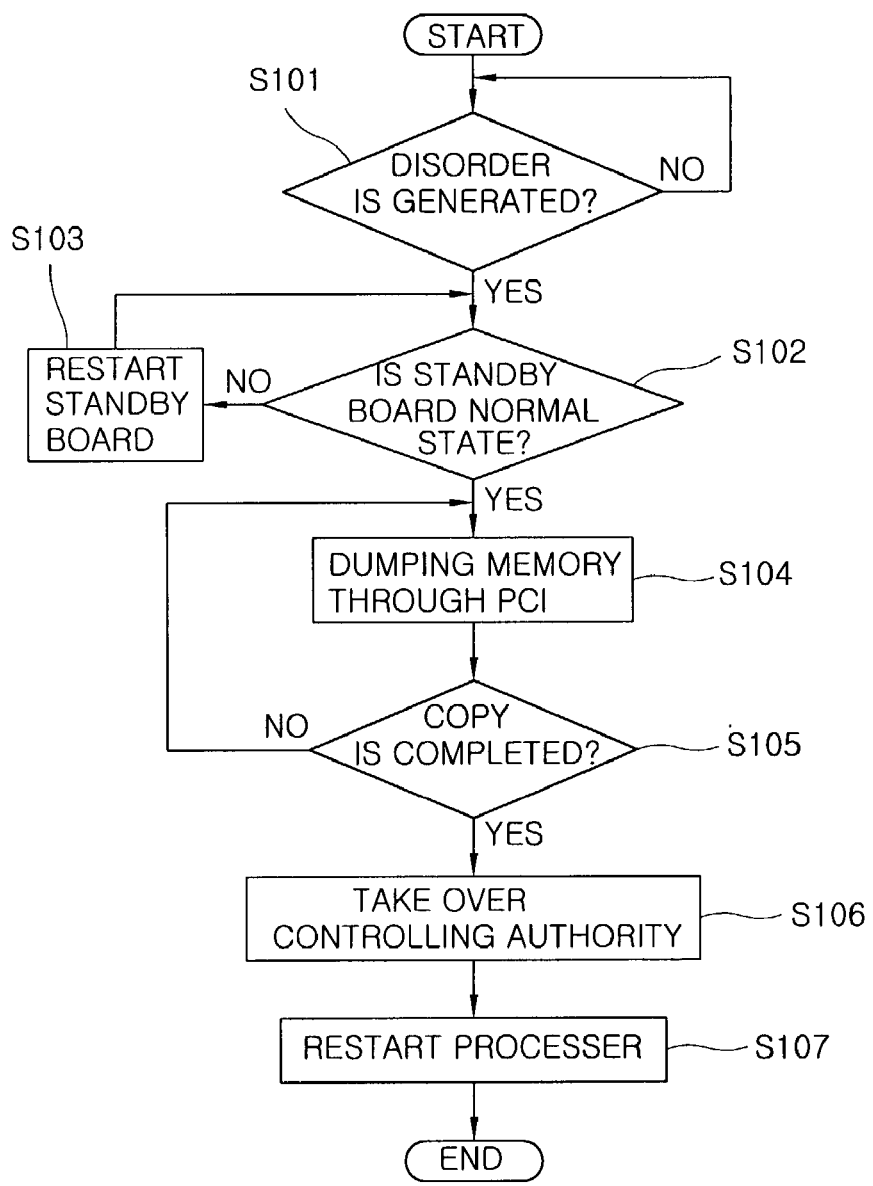
FIG. 3 illustrates a method for duplexing a processor based on RTOS in a mobile communication system according to another embodiments of the present invention.

FIG. 3 is a flow diagram showing steps included in a method for duplexing a processor in a mobile communication system according to another embodiment of the present invention. In this embodiment, the active board does not perform access to a memory of the standby board for a memory synchronization, but rather dumps, contents of a memory of the active board to the standby board using a high-speed PCI bus and then takes over the controlling authority to the standby board at the time of switching for duplexing. Accordingly, the standby board can consecutively start an operation of the active board.

The case where the first board 100 is active state and the second board 200 is in standby state will now be explained. When a fault occurs in the active board 100, the fault detection block of the RTOS 301 in the active board detects the fault. The fault management block 302 then classifies the detected fault and the fault recovery block 304 certifies whether the classified fault requires switching for duplexing or not (S101). At this time, the standby board 200 detects an occurrence of a fault of the active board 100.

If a fault requiring a switching for duplexing occurs, the fault recovery block 304 requires a switching for duplexing. Accordingly, a duplexing control unit 106 of the active board 100 certifies whether the standby board 200 is mounted in a normal state or not and then reports the certified result to the RTOS of the active board 100 (S102).

If the standby board 200 is not in a normal state, the RTOS of the active board 100 commands a restarting through the ethernet controlling unit 103 so as to make the standby board 200 be in the normal state (S103).

If the standby board 200 is in normal state, in the presence of the command of the fault recovery block 304, the PCI controlling unit 105 directly accesses the memory unit 104 without using application software of the first and second processors 101 and 102, and transmits contents of the memory unit 104 at a fast rate to the standby board 200 through the PCI bus. Then, the standby board 200 copies contents of memory unit 104 at a fast rate and transmits the copied contents at high-speed to the memory unit 204 (S104). At this time, contents of a variable data region excluding a fixed data region of memory unit 104 are fast copied. The PCI bus then transmits contents of memory unit 104 to the standby board 200 with an operation speed of, for example, 33 MHz. In the case where replacement of the PCI bus performance is required when a fault occurs at the PCI bus, ethernet controlling unit 103 fast transmits contents of the memory unit 104 at a fast rate to the standby board using a high-speed ethernet channel. In case of transmitting the contents by the ethernet controlling unit 103, an application software is intervened.

When the active board 100 is normally operated, the RTOS of the active board 100 does not perform synchronization between memory units 104 and 204 of the active board and the standby board. If a critical fault is generated at the active board, the RTOS of the active board backs up contents of memory unit 104 of the active board to the memory unit 204 of the standby board, thereby performing memory synchronization and a switching for duplexing.

In this case the contents of the memory unit 104 is backed up, information of a program counter and contents of each register are transmitted from the active board 100 to the standby board 200 so as to normally operate the standby board 200 without interrupting a service. If the copy of memory unit 104 is completed (S105), the controlling authority is taken over from the active board to the standby board (S106). Also, an operation of the memory dump performed at the time of duplexing requires a dump time for stability.

Then, the standby board 200 consecutively starts an operation performed by the active board, thereby, not interrupting a program being performed by a user corresponding to a connected call service. In the meantime, the active board is re-booted (S107). According to this, duplexing of a processor level is realized by consecutively performing an operation of the active board by the standby board. Also, a substructure (hardware and RTOS) performs a duplexing operation without the application software.

The processor duplexing apparatus based on RTOS in a mobile communication system and the methods thereof according to the present invention, thus, have at least the following advantages.

First, duplexing is performed by a substructure (hardware and OS), so that the duplexing of a processor level is realized without intervention of application software. Accordingly, a burden of the application software growing larger and more complicated can be decreased.

Second, since a high speed PCI bus is connected between the active board and the standby board, and a memory of the active board is backed up to the standby board using the high speed PCI bus at the time of switching for duplexing to perform a memory synchronization, a duplexing apparatus based on RTOS can be realized by using high speed processor in a mobile communication system.

Third, when the active board is a normal state, an operation for memory synchronizations is not performed. Meanwhile, when the RTOS performs a switching for duplexity, a memory of the active board is backed up to the standby board so as to make memory synchronization. According to this, additional processes for duplexing are not required during the active operation, thereby having a simple algorithm of the RTOS for duplexing.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures.

What is claimed is:

1. A processor duplexing apparatus in a mobile communication system, comprising:

an active board; and a standby board, wherein the boards have a real time operating system (RTOS) which detects a need for and executes a dual switching operation, wherein each of the active board and the standby board includes:

a processor for loading the RTOS which performs a duplexing operation without intervention of application software;

a memory circuit to store at least one of programs or data required for system operation;

a PCI controlling circuit to directly access a memory of a self side board at a time of dual switching, and to dump contents of the memory of the self-side board to a memory of an opposing board;

an ethernet controller to transmit data between the self-side board and the opposing board through an ethernet channel; and a duplexing control to prevent memory access collision between the self-side board and the opposing board.

2. The apparatus of claim 1, wherein the RTOS includes:
a fault detection unit for detecting a fault;
a fault management unit for classifying the fault;
a duplexing state management unit for managing a duplexing state and a state transition;
a fault recovery unit for recovering the fault by performing the dual switching operation when the classified fault requires dual switching; and
an interface unit for interfacing with a user.

3. The apparatus of claim 1, wherein information including a program counter and contents of at least one register is transmitted to the standby board at the time of dumping the memory of the active board.

4. The apparatus of claim 1, wherein the PCI controlling unit of the active board transmits the contents of the memory of the active board to the standby board through a PCI bus and performs back up operation when the RTOS of the active board requires dual switching.

5. The apparatus of claim 4, wherein the contents of the memory include data stored in a variable data region.

6. A RTOS for operating a processor duplexing apparatus in a mobile communication system, comprising:
a fault detection unit for detecting a fault;
a fault management unit for classifying the fault;
a duplexing state management unit for managing a duplexing state and state transition;
a fault recovery unit for recovering the fault by requiring switching for a duplexing operation when the classified fault corresponds to a predetermined type of fault; and
an interface block for interfacing with a user, wherein the duplexing operation is performed without intervention of application software, wherein the fault recovery unit:
determines whether a standby system is in a predetermined operating state, and
controls a PCI controlling unit in an active system in which the fault is detected to dump contents of a memory of the active system into a memory of the standby system, the contents of said memory dumped through a PCI bus coupled between the active and standby systems,
wherein if the standby system is not in said predetermined operating state, the fault recovery unit sends a command through an ethernet channel coupled between the active and standby systems to restart the standby system so that said memory dump can be performed.

7. The method of claim 6, wherein the fault recovery unit controls an ethernet controlling unit to replace operation of the PCI controlling unit when the fault occurs in the PCI bus or in the PCI controlling unit of the active system, the ethernet controlling unit dumping contents of the memory of the active system into the memory of the standby system through the ethernet channel.

8. A method for duplexing a processor based on RTOS in a mobile communication system, comprising:
detecting whether a dual switching operation between an active board and a standby board is required;
dumping a memory of the active board into a memory of the standby board if the dual switching operation is required; and
starting the standby board in order to succeed to an operation of the active board and resetting the active board, wherein dumping the memory includes:
directly accessing the memory of the active board without using a processor thereof;
transmitting contents of the accessed memory to the standby board through a PCI bus; and
copying the transmitted contents into the memory of the standby board, said method further comprising:
transmitting data between a self-side board and the opposing board through an ethernet channel; and
preventing memory access collision between the self-side board and the opposing board during the dual switching operation.

9. The method of claim 8, wherein a memory synchronization process is not performed when the active board is normally operated.

10. The method of claim 8, wherein information including at least one of a program counter and contents of a register is transmitted to the standby board at the time of dumping the memory.

11. The method of claim 8, wherein contents of the accessed memory include contents stored at a variable data region.

12. The method of claim 8, further comprising:
certifying whether the standby board is a normal state or not when requirement of dual switching operation is detected;
detecting whether a standby board is operating in a normal state;
transmitting a command through an Ethernet channel coupled between an active board and the standby board, said command commanding a restart to the standby board if the standby board is not in a normal state; and
starting the memory dump if the standby board is a normal state, and performing the memory dump through a PCI bus coupled between the active and standby boards after the standby board has been restarted.

* * * * *